United States Patent [19]

Cox et al.

[11] Patent Number: 5,485,816
[45] Date of Patent: Jan. 23, 1996

[54] CHARCOAL BURNING COOKING DEVICE

[76] Inventors: Verlon F. Cox, 1576 Lake Shore Blvd., Jacksonville, Fla. 32210; Don Chaney, 6086 Gulf Rd. North, Jacksonville, Fla. 32244

[21] Appl. No.: 312,873

[22] Filed: Sep. 27, 1994

[51] Int. Cl.⁶ .................................................. F24B 3/00
[52] U.S. Cl. .................. 126/25 R; 126/37 R; 126/15 R; 126/21 R; 126/273 R; 126/275 R
[58] Field of Search ................................. 126/25 R, 37 R, 126/15 R, 21 R, 273 R, 275 R; 99/482, 467

[56]  References Cited

U.S. PATENT DOCUMENTS

| | | | |
|---|---|---|---|
| 4,643,162 | 2/1987 | Collins | 126/41 R |
| 4,669,447 | 6/1987 | Kelly | 126/25 R X |
| 4,757,756 | 7/1988 | Van Marr | 99/482 |
| 4,815,439 | 3/1989 | Houck | 126/41 R X |
| 4,877,011 | 10/1989 | Willice | 126/25 R |
| 4,979,436 | 12/1990 | McGowan | 99/340 |

*Primary Examiner*—Larry Jones
*Attorney, Agent, or Firm*—Thomas C. Saitta

[57]  ABSTRACT

An oven utilizing charcoal as the source of cooking heat is disclosed, the oven having a thermostatically controlled charcoal ignition means used only to ignite and then reignite the charcoal in response to any temperature drop below a predetermined lower limit.

6 Claims, 2 Drawing Sheets

5,485,816

CHARCOAL BURNING COOKING DEVICE

BACKGROUND OF THE INVENTION

This invention relates generally to the field of enclosed cooking devices known as ovens or smokers, and more particularly, to the field of such devices which incorporate electric heating elements. Even more particularly, the invention relates to such devices which utilize charcoal as the primary source of cooking heat.

The cooking of meat, especially in restaurant situations, is almost universally accomplished with either gas or electrical elements providing the source of heat—primarily because of convenience. This is in spite of the fact that it is widely accepted that, especially for certain types of cooking and for certain meats, cooking over a charcoal fire is much preferable in terms of taste. The vast majority of home barbequers have replaced their charcoal grills with either gas grills or grills using electrical heating elements—sacrificing taste for the fact that these grills do not require advance lighting nor monitoring of the heat supplying source. Cooking with charcoal requires lighting the charcoal briquets well in advance and continual concern over the air supply and compaction of the briquets to insure that the cooking temperature remains constant. These requirements all but preclude the use of charcoal for cooking in most commercial settings.

The typical large oven or smoker utilizes one or more electric cooking elements connected to a thermostat to monitor cooking temperature. The desired cooking temperature inside the oven is attained by turning on the cooking elements and running them continually or cycling them with the thermostat. Even in ovens or smokers which incorporate the burning of wood chips or the like to improve on the flavor of the meat, the cooking is done entirely by the electric elements with the wood chips added solely to provide a flavor-imparting smoke.

It is an object of this invention to provide an oven suitable for commercial use in which the cooking heat is supplied by charcoal briquets rather than gas or electric heating elements. It is a further object to provide such an oven adapted such that the charcoal is ignited by electric or gas ignition means and further that the burning of the charcoal is maintained at a relatively constant level through thermostatically controlled cycling of the ignition means to reignite the charcoal when the internal temperature of the oven drops below a preset value.

SUMMARY OF THE INVENTION

The invention is an oven comprising a cooking housing, preferably insulated, which is sealable by a door to create an enclosed cooking compartment. Small vents are positioned to allow for some air circulation into, within and out of the oven. One or more racks are positioned within the oven to hold the meat or other foods to be cooked. The oven may consist of a single compartment, or the oven can be divided into plural cooking compartments. One or more thermostats, of any known type suitable for the required temperature ranges, are appropriately mounted in the oven housing and are used to monitor the cooking temperature and to cycle a charcoal ignition means, such as an electric or gas heating element, mounted inside the housing, preferably at or near the bottom. Mounted directly above and close to the ignition means is a basket or pan suitable for holding a number of charcoal briquets or the like. Beneath the charcoal basket is a pan to catch ashes and/or fat drippings from the meat being cooked. In ovens where the charcoal basket is not positioned directly below the meat racks, or in ovens with multiple compartments, a separate pan is utilized to catch the drippings.

Unlike conventional ovens having electric or gas heating elements, the invention does not use the electric or gas heating element to provide the cooking heat. Instead the electric or gas heating element is used only to initially ignite the charcoal and to reignite the charcoal when necessary. In practice, once the ignition means is turned on initially, the charcoal begins to burn and the internal temperature of the oven rises. At a predetermined upper temperature limit, the thermostat turns off the charcoal ignition means and the charcoal cooks the food. Air supplied through the vents allows the charcoal to continue burning inside the closed housing. After a time, the smoldering charcoal begins to produce less heat, due to ash buildup and other considerations. When the internal temperature of the oven drops below a preset lower temperature limit, the thermostat reactivates the ignition means to reignite the charcoal. When the charcoal is again burning with maximum heat intensity and the internal temperature of the oven reaches the preset upper limit, the ignition means is again deactivated. This cycle continues until the meat is cooked or until the charcoal needs to be replaced. The time during which the ignition means is operating, as well as the number of times the ignition means is cycled, is dramatically reduced as compared to conventional ovens which utilize a heating element to provide the cooking heat. In this manner the meat is cooked with the desirable charcoal flavor, the cooking process is self-maintaining and the oven is less expensive to operate.

DETAILED DESCRIPTION OF THE INVENTION

Figure 1:
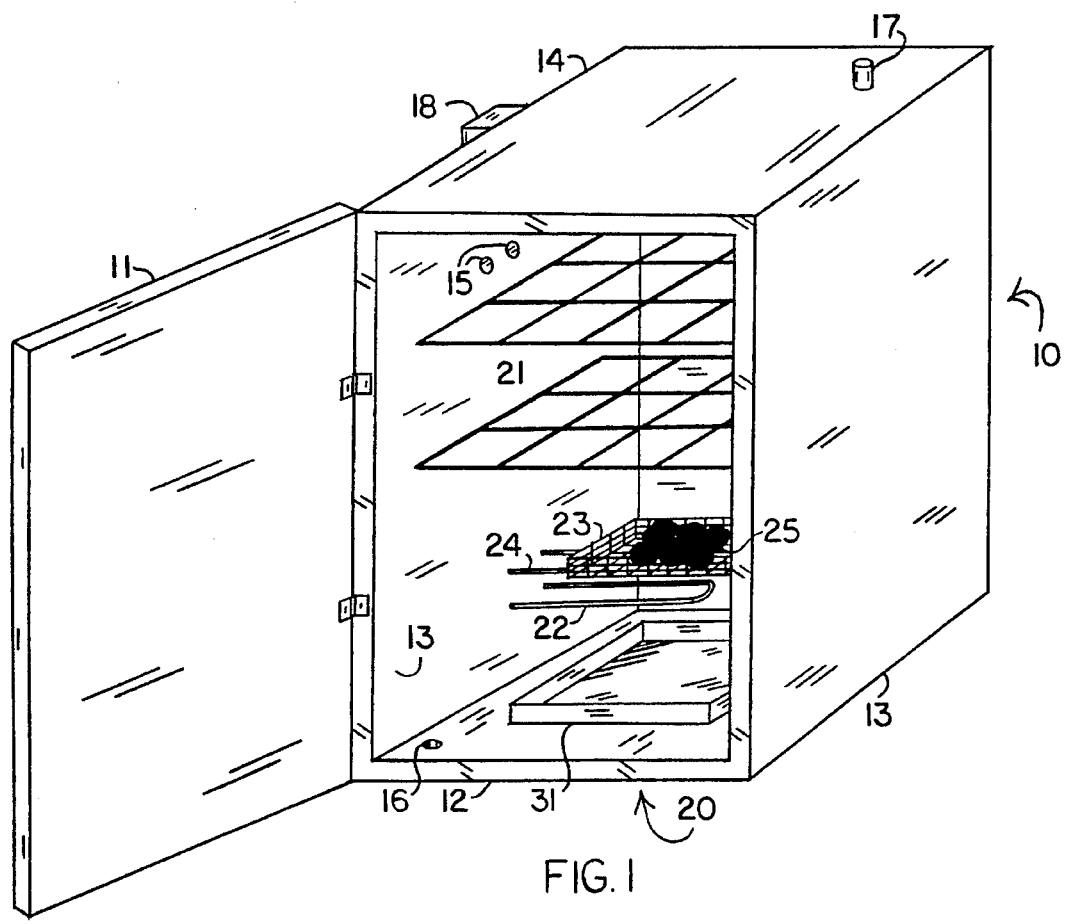
FIG. 1 is a perspective view of a single compartment oven.

With reference now to the drawings, the invention will now be described in detail, with presentation of the best mode and the preferred embodiment. As shown in FIG. 1, the invention mainly comprises a generally closed housing 10 consisting of a bottom 12, side walls 13 and a top 14, with access provided by door 11. Housing 10 is preferably insulated, and may comprise shapes other than rectangular. Housing 10 may be composed of any material suitable for use as the structure of an oven, such as for instance sheets of stainless steel or aluminum sandwiching an insulating material. The internal area of housing 10 may comprise a single compartment 20 for cooking or may be divided into multiple compartments 20 as shown in the other figures. One or more racks 21 to receive meat or food for cooking are positioned within compartment 20. The integrity of housing 10 is compromised by a lower vent 16 and an upper vent 17. This allows fresh air to be drawn into the cooking compartment 20 through lower vent 16 and allows smoke and combustion by-products to exit through upper vent 17. Lower vent 16 may also act as a drain if positioned in bottom 12. One or more thermostats 15 are mounted internally in housing 10 to monitor the temperature of the cooking compartment 20. These thermostats 15 may be of any type suitable for this application and are well known in the art. The thermostat 15 is connected to a temperature controller means 18 which receives the temperature information from the thermostat 15 and compares it to predetermined upper and lower temperatures. Controller 18, also of any commonly known type suitable for this application, controls electrical power to charcoal ignition means 22, here shown as an electric heating element, activating and deactivating ignition means 22 in response to the internal temperature of the compartment 20.

Figure 3:
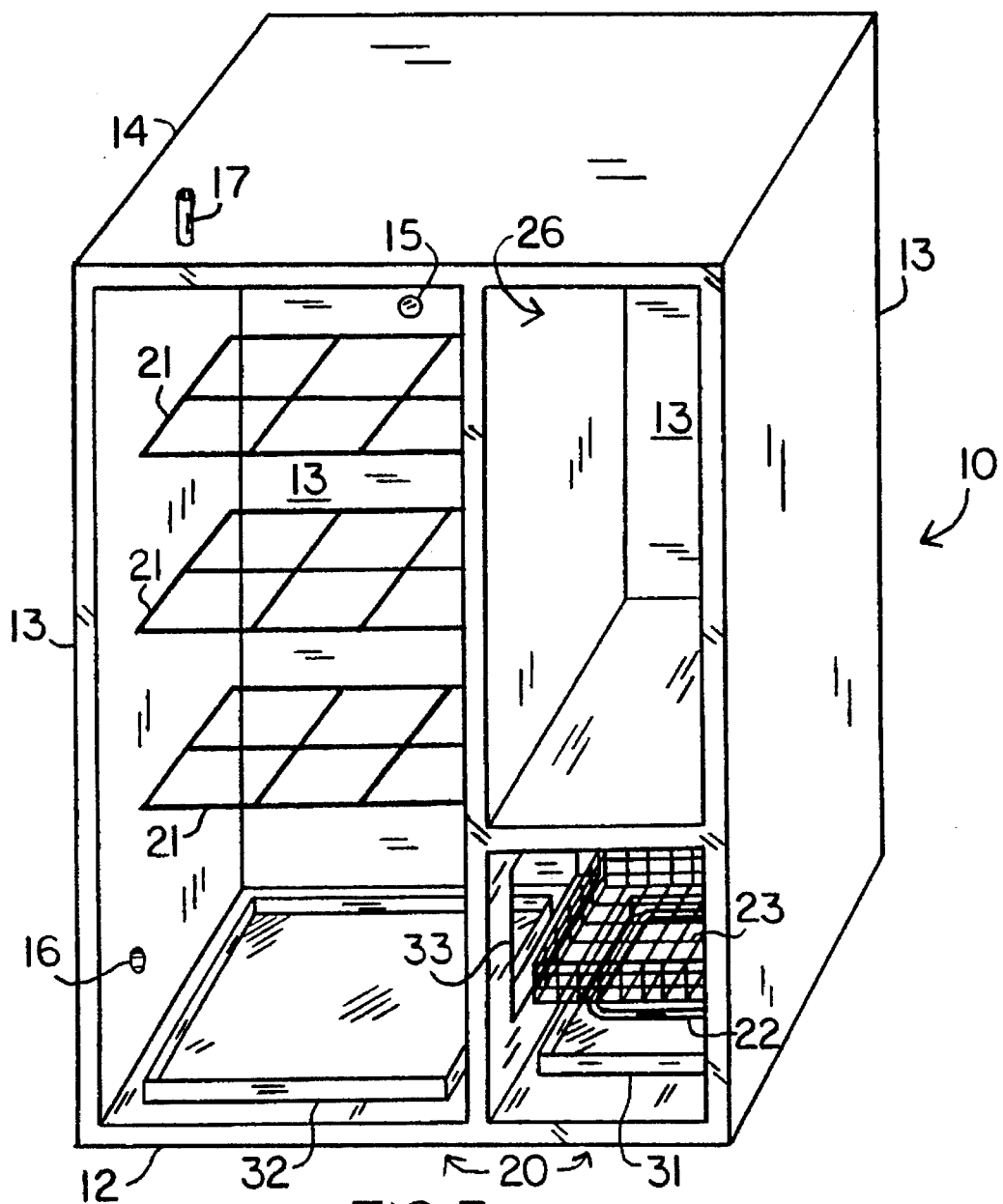
FIG. 3 is a perspective view of another embodiment of the invention showing the inclusion of a warmer compartment, also with the door removed for clarity.

Ignition means 22 is mounted at or near the bottom 12 of compartment 20 and is connected to controller 18. A charcoal receiving container 23 is positioned directly above ignition means 22, in close proximity or contiguous to it. Charcoal receiving container 23 preferably comprises a wire basket or the like, into which is placed a suitable amount of charcoal 25, usually in the form of briquets. The charcoal receiving container 23 may rest directly on the ignition means 22 or support means 24 may be incorporated to hold the charcoal receiving container 23 slightly above ignition means 22. It is essential that the charcoal 25 be maintained very close to ignition means 22, since the ignition means 22 is used to ignite and reignite charcoal 25, not to provide heat to the compartment 20 to cook the food. In very large ovens or in ovens with multiple compartments 20, multiple ignition means 22 and charcoal receiving containers 23 may be utilized. In ovens with multiple ignition means 22, they may be independently controlled by controller 18. Likewise, although reference is made to electric heating elements as ignition means 22, it would also be possible to construct the invention using gas heating elements, 27, as shown in FIG. 3, to ignite and reignite the charcoal 25. An ash collector means 31 may be positioned beneath the charcoal 25 and a drippings collector means 32 may be positioned beneath the racks 21 for convenience. In the single compartment embodiment shown in FIG. 1, a single pan or tray may act as both the ash collector 31 and the drippings collector 32.

To use the invention, charcoal 25 is placed into the charcoal receiving container 23 and meat to be cooked is placed onto racks 21 and the door 11 is closed. The lower temperature limit and upper temperature limit is set in controller 18, such that power is supplied to ignition means 22 whenever thermostat 15 indicates the temperature in compartment 20 is below the lower limit. When thermostat 15 indicates the internal temperature has reached the upper limit, controller 18 deactivates ignition means 22. At the start, the internal temperature is below the preset lower limit, so the ignition means 22 is activated. This ignites the charcoal 25 in the same manner that conventional electric charcoal starters work. Once the full amount of charcoal 25 is burning, the temperature within the compartment 20 rapidly rises. This rise in temperature occurs much more rapidly than in typical ovens where only electric or gas heating elements are used to supply the heat for cooking. When the upper temperature limit is reached, controller 18 turns off ignition means 22, but the charcoal 25 continues to supply heat. After some time has elapsed, the heat produced by charcoal 25 decreases and the internal temperature will drop below the lower limit. At this point, controller 18 again activates ignition means 22. Because of the proximity of ignition means 22 to the charcoal receiving container 23, the heat produced by ignition means 22 reactivates combustion in charcoal 25 such that a large amount of heat is again produced and the internal temperature is again raised above the upper limit, whereupon ignition means 22 is again deactivated. Because the charcoal 25 rapidly increases its heat output, the ignition means 22 need be activated only a short period of time as compared to those ovens where the heating element is the sole source of heat. This cycling continues until the food is cooked or until the charcoal 25 needs to be replenished.

For example, controller 18 was set with a lower temperature limit of 240 degrees F. and an upper temperature limit of 290 degrees F. in order to cook a 19 pound whole turkey. Eighteen charcoal briquets 25 were placed into charcoal receiving container 23, the turkey placed on a rack 21 and the door 11 closed. Controller 18 turns on ignition means to ignite charcoal 25. In eighteen minutes, the temperature inside compartment 20 reached 290 degrees and the controller 18 deactivated ignition means 22. After thirty-five minutes of cooking with the charcoal 25, the internal temperature dropped below 240 degrees and the ignition means 22 was reactivated to reignite the charcoal 25. The reactivated charcoal rapidly raised the temperature back to 290 degrees within five minutes and the ignition means 22 was turned off. This automatic cycling of thirty-five minutes off and five minutes on continued for six hours until the turkey was cooked. At the end of this time only approximately half of the charcoal 25 was exhausted.

Figure 2:
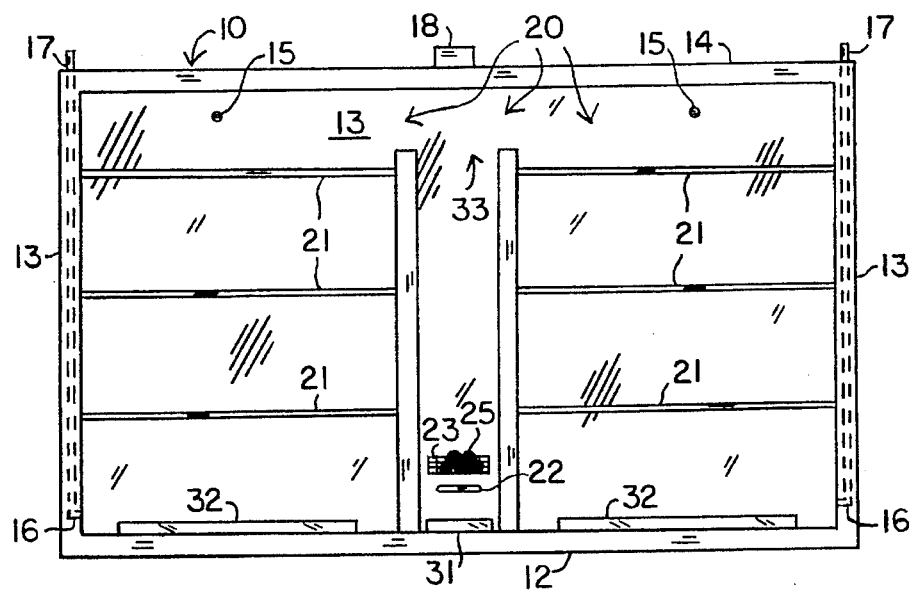
FIG. 2 is a front view of a double compartment oven with the doors removed for clarity.

As shown in FIG. 2, the invention may comprise a housing 10 with multiple compartments 20. In the embodiment shown, the ignition means 22, charcoal receiving container 24 and charcoal 25 are located between two cooking compartments 20, each having a number of cooking racks 21 and individual thermostats 15. Heat access aperture 33 allows the heat from the burning charcoal 25 to reach both compartments 20. Each compartment 20 has its own upper vent 17, which opens internally into each compartment 20 near the bottom 12 so that the heat is drawn by convection currents from the heat access aperture 33 down through the racks 21. Alternatively, the heat access aperture could be placed near the bottom of the compartments 20, as shown in FIG. 3. FIG. 3 incorporates still another possible compartment 20, in this case a warming compartment 26 having no direct heat access to the charcoal 25.

It is contemplated that substitutions and equivalents to the above components may be obvious to those skilled in the art, and the above examples are by way of illustration only. The true scope and definition of the invention therefore is to be as set, forth in the following claims.

We claim:

1. A food cooking oven which utilizes charcoal to supply the heat to cook the food, said oven comprising a housing, a door, a charcoal container, charcoal ignition means, a thermostat to monitor internal temperature within the housing, and temperature controller means connected to said thermostat and said charcoal ignition means, whereby said temperature controller means activates and deactivates said charcoal ignition means in response to said internal temperature, said charcoal ignition means and said charcoal container being in close proximity to one another such that said charcoal ignition means ignites and reignites charcoal contained in said charcoal container.

2. The oven of claim 1, where said charcoal ignition means comprises an electric heating element.

3. The oven of claim 1, where said charcoal ignition means comprises a gas burning element.

4. The oven of claim 1, where said temperature controller means activates said charcoal ignition means when the temperature within said housing is below a predetermined value and deactivates said charcoal ignition means when said temperature is above a different predetermined value.

5. The oven of claim 1, where said housing is divided into plural compartments, whereby one of said plural compartments contains said charcoal receiving container and said charcoal ignition means, and another of said compartments contains the food to be cooked, and further comprising one or more heat access apertures between said compartments.

6. The oven of claim 5, where still another of said plural compartments is completely separated from the other compartments.

* * * * *